(12) United States Patent
Watson

(10) Patent No.: US 6,191,925 B1
(45) Date of Patent: Feb. 20, 2001

(54) DUAL ELEMENT READ WITH SHAPED ELEMENTS

(75) Inventor: Mark L. Watson, Louisville, CO (US)

(73) Assignee: Storage Technology Corporation, Louisville, CO (US)

( * ) Notice: Under 35 U.S.C. 154(b), the term of this patent shall be extended for 0 days.

(21) Appl. No.: 09/335,931

(22) Filed: Jun. 18, 1999

(51) Int. Cl.[7] ............................................. G11B 5/39
(52) U.S. Cl. ............................................. 360/314
(58) Field of Search ............................. 360/314, 315, 360/316, 322, 327

(56) References Cited

U.S. PATENT DOCUMENTS

| | | |
|---|---|---|
| 3,860,965 | 1/1975 | Voegeli . |
| 4,684,658 | 11/1997 | Shi et al. . |
| 4,956,736 * | 9/1990 | Smith ................................. 360/113 |
| 5,216,560 | 6/1993 | Brug et al. . |
| 5,309,305 | 5/1994 | Nepela et al. . |
| 5,508,866 | 4/1996 | Gill et al. . |
| 5,696,654 | 12/1997 | Gill et al. . |

* cited by examiner

Primary Examiner—Robert S. Tupper
(74) Attorney, Agent, or Firm—Brooks & Kushman P.C.

(57) ABSTRACT

A magnetoresistive element for a dual element read head should exhibit uniform current density for proper biasing and Barkhausen noise limiting. Each element is a thin film MR layer normal to the magnetic media. Each element includes a front edge parallel with the magnetic media surface. A back edge, longer than the front edge, is opposite the front edge. Conductors through which current enters and exits the MR layer are adjacent to either end of the back edge.

12 Claims, 4 Drawing Sheets

DUAL ELEMENT READ WITH SHAPED ELEMENTS

TECHNICAL FIELD

The present invention relates to dual element read heads for accessing data stored on magnetic media.

BACKGROUND ART

Information is written onto a magnetic medium by magnetizing elements within the medium. These magnetized elements produce a magnetic field which can be detected and converted to an electrical signal by a read head as the magnetic media passes by the read head. A common type of read head for carrying out this conversion is the magnetoresistive (MR) read head.

A simple MR head consists of a thin film of magnetoresistive material, such as Permalloy, between two insulating layers. When the MR layer is formed, a magnetic field is typically applied in a direction parallel to the plane of the thin layer. Thus, the MR layer exhibits a uniaxial anisotropy with an easy-axis of magnetization parallel to the direction of the applied field. If an external magnetic field, such as from the magnetic medium, is applied normal to the easy-axis, the magnetization direction of the MR layer will rotate away from the easy-axis and towards the direction of the applied magnetic field. This magnetization rotation causes a change in resistance in the MR layer. When no external field is applied, the resistance is greatest. The resistance decreases with increasing applied field. For practical geometries of the MR layer, resistance as a function of applied field traces a bell-shaped curve. The MR head is often biased with an applied current such that a zero magnitude applied field results in a resistance near an inflection point on the resistance curve. Thus, small changes about a zero magnitude applied external field result in nearly linear changes in resistance.

To accommodate increasing densities of data stored on magnetic media, the geometries of read heads continue to shrink. One difficulty encountered is the increasing effect of Barkhausen noise. As the width of the MR layer is narrowed, the MR layer tends to split into magnetic domains, resulting in demagnetization. In the presence of an increasing externally applied field, the domain walls can make sudden movements, causing jumps in the output signal. Two methods exist to reduce or eliminate Barkhausen noise. The first is to increase the effective length of the MR layer. Lengthening the MR layer reduces the effect of demagnetization at the ends and, hence, results in a greater retention of a single magnetic domain. The main difficulty with this technique is that the resulting increase in read head size is contrary to the need for increased data density on magnetic tapes. The second technique uses a small magnetic field in the direction of the easy-axis to induce a single domain state in the MR layer. An implementation of this method uses permanent magnets placed over the ends of the MR layer. These magnets strongly pin the domains of the MR layer under the magnets and create a weak longitudinal magnetic field in the MR layer between the covered ends. Difficulties with this implementation include complex geometries and additional processing steps required to implement the additional permanent magnetic.

In addition to Barkhausen noise, cross-sensitivities to other parameters, such as temperature asperity noise, feed through noise, drive noise, and the like, can affect the performance of the MR head. A dual active element MR read head minimizes cross-sensitivities. The dual active element MR head includes two MR layers in parallel separated by an insulating layer. Two additional insulating layers, one on each end of the structure, insulate the MR layers from surrounding materials. The two MR layers are connected in parallel to a source current such that current flows in the same direction through both layers. The fringe field produced by the current flowing through each MR layer biases the adjacent layer. Hence, an externally applied magnetic field produces an increase in resistance of one MR layer and a corresponding decrease in resistance of the other MR layer. A differential amplifier with an input connected to each MR layer converts these changes in resistance to an output voltage. Environmental changes to both MR layers, such as changes in temperature, appear as common mode inputs to the differential amplifier and, hence, are rejected.

The current is supplied to each MR layer through conductors. The conductors are typically constructed from metal such as gold or copper to reduce lead resistance and, hence, increase signal amplitude. Low conductivity metals are susceptible to one or more of corrosion, wear, and abrasion. This is particularly true when the magnetic media is tape, which comes into contact with and abrades the read head surface. Therefore, the conductors are typically connected at the side of the MR layer opposite from the exposed surface of the read head. One problem created by conductors connected to the MR layer back edge is the creation of two right angle bends in the current path through the MR layer. The resulting current path has a distinctly nonuniform current density near regions where current enters and exits the MR layer. Also, the right angle bends in the current path result in areas of low current density in the corners opposite where the conductors join the MR layer in the rectangularly shaped MR layers. These low current density regions generate very low fields and, hence, are more susceptible to domain formation and resulting Barkhausen noise.

What is needed is a dual active element MR read head with reduced Barkhausen noise susceptibility. The read head should have MR layers with a more uniform biasing than present designs. The read head should have a simple construction which is inexpensive to manufacture and which is compatible with existing thin film designs.

DISCLOSURE OF INVENTION

It is an object of the present invention to provide MR layers with increased biasing field uniformity.

Another object of the present invention is to provide a dual active element magnetoresistive read head with reduced Barkhausen noise.

Still another object of the present invention is to provide a reduced noise read head with protected conductors.

Yet another object of the present invention is to provide a dual active element MR read head with reduced Barkhausen noise that has a simple construction.

In carrying out the above objects and other objects and features of the present invention, a dual element read head for accessing data recorded on magnetic media passing by the read head is provided. Each element is a thin film MR layer normal to the magnetic media. Each element includes a front edge parallel with the magnetic media surface. A back edge, longer than the front edge, is opposite the front edge. Conductors through which current enters and exits the MR layer are adjacent to either end of the back edge.

In embodiments of the present invention, the MR layer further includes side edges joining the front edge and the back edge. In one embodiment, each side edge forms a substantially 45 degree angle with the back edge. In another embodiment, each side edge includes a convex curve. In yet another embodiment, each side forms a non-acute angle with the front edge at a point where the side edge joins the front edge.

In another dual element read head, the back edge is adjacent to a first conductor at one end and a second conductor at an opposite end. Current enters the MR layer through the first conductor and exits through the second conductor. Each side edge directs the current through the MR layer with a substantially uniform current density.

The above objects and other objects, features and advantages of the present invention are readily apparent from the following detailed description of the best modes for carrying out the invention when taken in connection with the accompanying drawings.

BEST MODE FOR CARRYING OUT THE INVENTION

Figure 1:
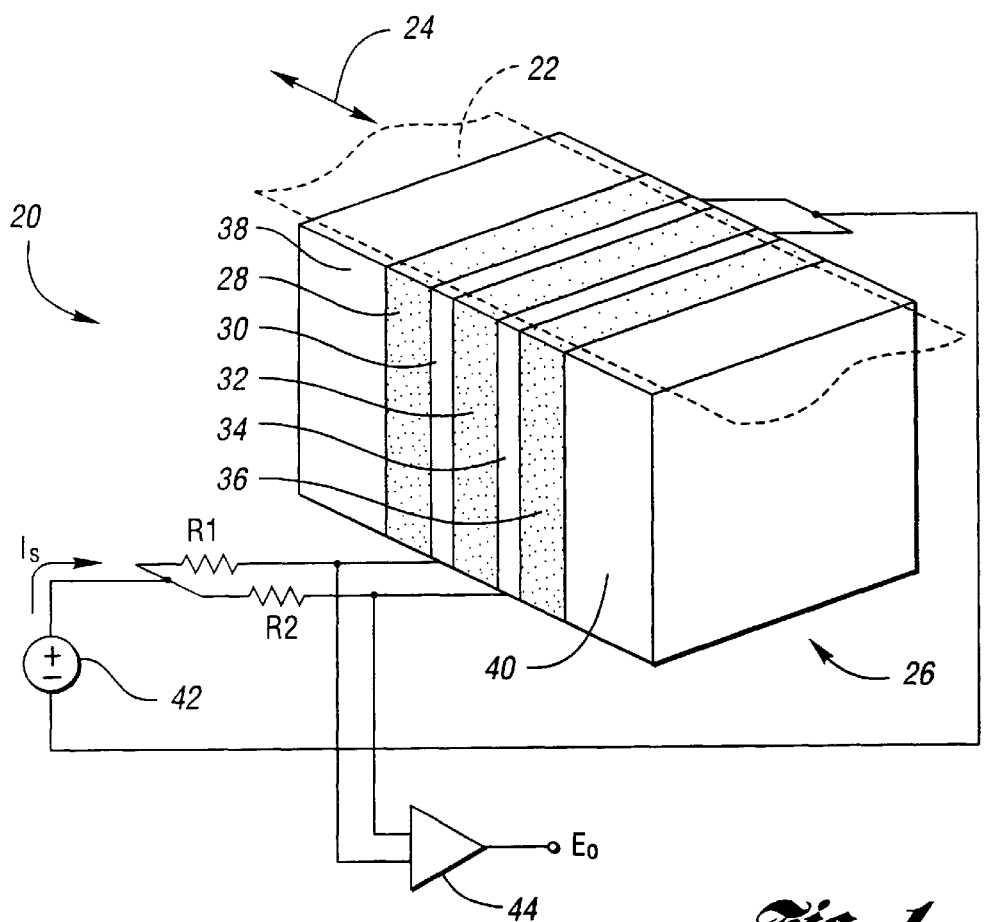
FIG. 1 is a schematic diagram of a dual active element magnetoresistive sensor.

Referring now to FIG. 1, a schematic diagram of a dual active element magnetoresistive read head is shown. A magnetoresistive (MR) read head, shown generally by 20, detects magnetic field patterns on magnetic media such as tape 22 as the magnetic media passes read head 20 in direction 24. Read head 20 includes a sensing element shown generally by 26. Sensing element 26 includes two active MR layers and three insulating layers. First insulator layer 28 insulates first active MR layer 30 from surrounding material. Second insulator layer 32 separates first active MR layer 30 and second active MR layer 34 and provides the magnetic gap spacing. Third insulator layer 36 insulates second active MR layer 34 from surrounding material.

In a preferred embodiment, first shield layer 38 is adjacent to first insulator layer 28 opposite from first MR layer 30. Also, second shield layer 40 is adjacent to third insulator layer 36 opposite from second MR layer 34. Shield layers 38,40 shield MR layers 30,34 from magnetic fields produced by magnetized regions of magnetic tape 22 not over MR layers 30,34. In addition to providing insulation, insulator layers 28,32,36 provide magnetic gap spacing between the two MR layers 30,34 and between each MR layer 30,34 and the nearest shielding layer 38,40.

Figure 2:
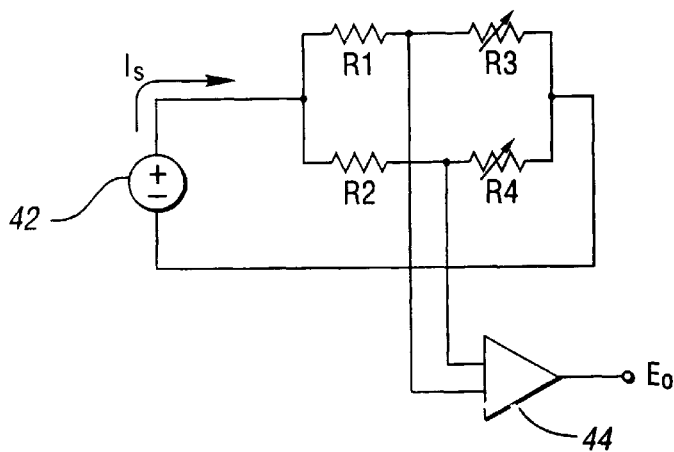
FIG. 2 is an equivalent circuit diagram for the dual active element magnetoresistive sensor of FIG. 1.

Referring now to FIG. 1 and to FIG. 2, in which an equivalent circuit diagram for the dual active element magnetoresistive read head of FIG. 1 is shown, the operation of the MR read head will be described. Independent voltage supply 42 provides a means for supplying current through first active MR layer 30 and second active MR layer 34. Other means for supplying current such as an independent current source, a dependent voltage source, or a dependent current source may be used as is known in the art. The supplied current, $I_s$, is split between two parallel paths. The first parallel path is through the series combination of resistor R1 and first active MR layer 30. The second path is through the series combination of resistor R2 and second active MR layer 34. Ideally, divided current $I_s$ flows through active MR layers 30,34 in a direction generally parallel to the surface of tape 22 and perpendicular to media direction 24. Current $I_s$ enters MR layers 30,34 through conductors which are more fully described with regards to FIG. 3 below.

Active MR layers 30,34 change resistance in response to flux produced by magnetized fields on tape 22. First active MR layer 30 is represented by variable resistor R3 and second active MR layer 34 is represented by variable resistor R4 in FIG. 2. Differential amplifier 44, connected across the junction between resistors R1 and R3 and the junction between resistors R2 and R4, provides means for detecting the relative change in resistance between first active MR layer 30 and second active MR layer 34. The output of differential amplifier 44, $E_O$, indicates changes in magnetized fields on tape 22 as these changes move past first one and then the other of active MR layers, 30,34.

Figure 3:
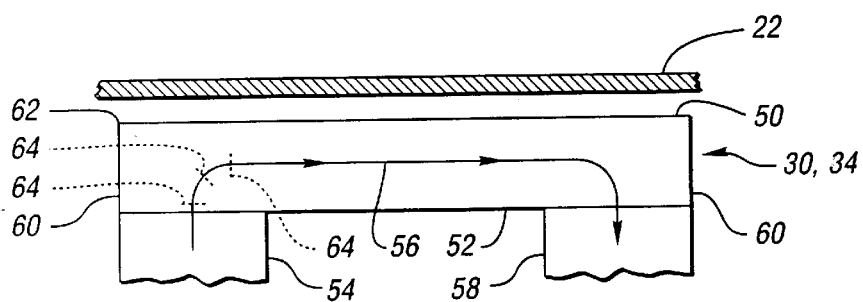
FIG. 3 is a schematic diagram of a prior art magnetoresistive layer with conductors.

Referring now to FIG. 3 a schematic diagram of a prior art magnetoresistive layer with conductors is shown. MR layer 30,34 has front edge 50 parallel with the surface of magnetic media being read. If this magnetic media is tape 22, the magnetic media may actually contact front edge 50 of MR layer 30,34. For reference, media direction 24 is typically into or out of the page holding FIG. 3.

MR layer 30,34 has back edge 52 opposite front edge 50. Conductor 54 adjacent to back edge 52 permits electrical current, shown generally by 56, to enter MR layer 30,34. Conductor 58, also adjacent to back edge 52, permits electrical current 56 to exit MR layer 30,34. Typically, conductors 54,58 are made of a highly conductive metal, such as copper or gold, to reduce lead resistance. Such metals are soft and may suffer abrasion, wear, corrosion, or the like if exposed to the atmosphere outside of sensing element 26 and, in particular, if contacted by tape 22. Hence, conductors 54,58 attach to the back side of MR layer 30,34 formed by back edge 52.

Each side edge 60 connects front edge 50 with back edge 52. Together, front edge 50, back edge 52, and side edges 60 form the boundaries for MR layer 30,34. Typically, MR layer 30,34 is formed such that the sides 50,52,60 form a rectangle when viewed from the top as shown in FIG. 3. One difficulty with this rectangular shape is that virtually none of current 56 reaches corners between front edge 50 and side edges 60, one of which is indicated by 62. This can be seen by considering points of equal potential generated in MR layer 30,34 by current 56, shown as equipotential lines 64.

Figure 4:
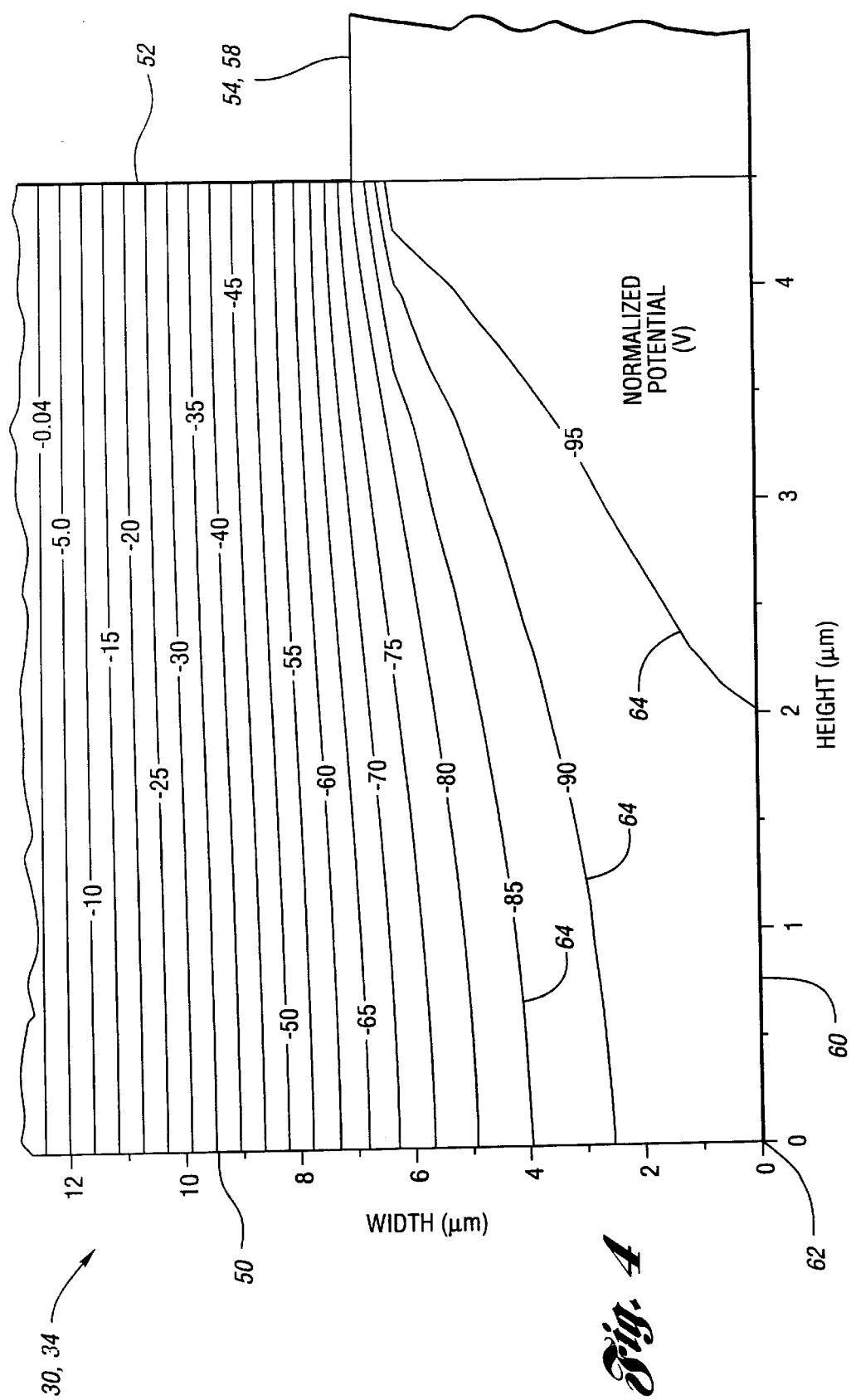
FIG. 4 is an electric potential diagram for the magnetoresistive layer of FIG. 3.

Referring now to FIG. 4, an electric potential diagram for the magnetoresistive layer of FIG. 3 is shown. For this example, MR layer 30,34 has a height of 4.5 $\mu$m from front edge 50 to back edge 52 and a width of 30 $\mu$m between sides 60. Conductor 54,58 is adjacent to one end of back edge 52 over a length of 7 $\mu$m. Simulated equipotential lines 64 are drawn through points of equal potential and are spaced at regular potential intervals. For this example, conductor 54,58 has a normalized voltage of 100 V and equipotential lines are spaced each 5 V. Typically, a maximum of 5 volts is applied to read head 20.

Current 56 flowing through MR layer 30,34 is subject to the condition that current 56 must be perpendicular to equipotential lines 64 and the boundary condition that current must be parallel with an edge 50,52,60 when at that edge. The density of current 56 flowing through MR layer 30,34 will be more uniform where equipotential lines 64 are more evenly spaced and will be greater in amplitude where equipotential lines 64 are more closely spaced. As can be seen, the region near back edge 52 has the greatest density and uniformity of current 56. In contrast, the area around corner 62 receives little current 56. Hence, the density of current across front edge 50 is not very uniform.

The pattern of equipotential lines 64 and resulting non-uniform density of current 56 shown in FIG. 4 creates many difficulties. First, the decrease in current 56 near corners 62 decreases the effective width for reading a track from tape 22 written onto the tape using an appropriate write head. This effective width is well beneath the physical width of MR layer 30,34. Second, the bias field strength in the region near corners 62 is significantly below the bias field in other regions of MR layer 30,34. Third, the bias field in the region near corners 62 is not oriented perpendicular to front edge 50. Fourth, the lack of biasing control in the region near corners 62 may result in an increase in domain structure in the region. Magnetic domains in this region may move, potentially leading to increased Barkhausen noise in read head 20.

Figure 5:
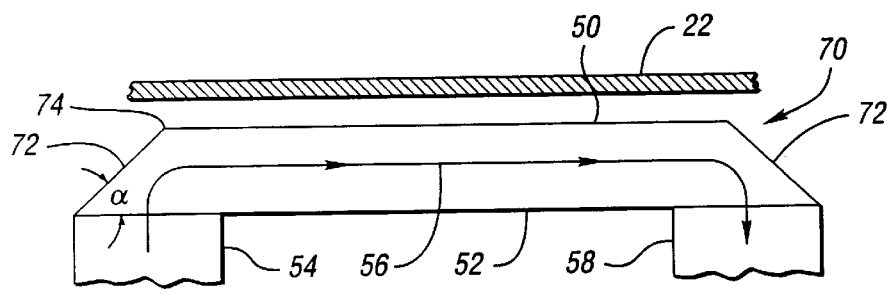
FIG. 5 is a schematic diagram of a magnetoresistive layer with conductors according to an embodiment of the present invention.

Referring now to FIG. 5, a schematic diagram of a magnetoresistive layer with conductors according to an embodiment of the present invention is shown. MR layer 70, which replaces MR layers 30,34 in sensing element 26, uses side edges 72 to direct current 56 through MR layer 70 with a substantially uniform current density. In the embodiment shown, side edges 72 appear as straight lines between one end of back edge 52 and the corresponding end of front edge 50. Each side edge 72 forms a substantially 45° angle α with back edge 52. The right corner 62 has been replaced by the non-acute corner 74. This results in back edge 52 being longer than front edge 50.

Figure 6:
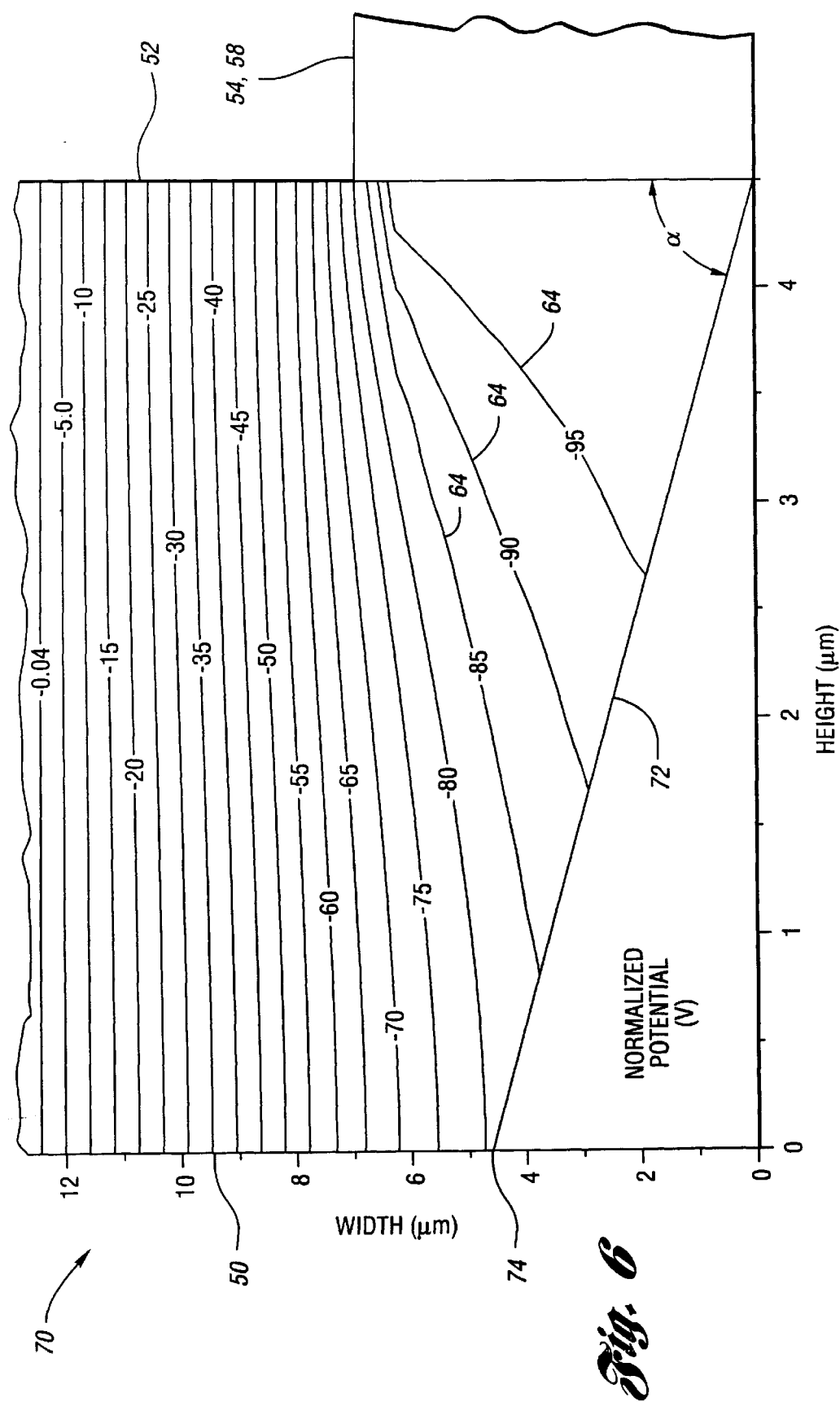
FIG. 6 is an electric potential diagram for the magnetoresistive layer of FIG. 5.

Referring now to FIG. 6, an electric potential diagram for the magnetoresistive layer of FIG. 5 is shown. As in the electric potential diagram of FIG. 4, MR layer 70 has a height of 4.5 μm from front edge 50 to back edge 52 and a width of 30 μm along front edge 50. Conductor 54,58 is adjacent to one end of back edge 52 over a length of 7 μm. Simulated equipotential lines 64 are drawn through points of equal potential and are spaced at regular potential intervals. For this example, conductor 54,58 has a normalized voltage of 100 V and equipotential lines are spaced each 5 V.

FIG. 6 illustrates a much greater uniformity for the density of current 56 near front edge 50. Also, equipotential lines 64 are more closely spaced along front edge 50. Therefore, the problems of shortened effective read track length and Barkhausen noise associated with MR layer 30,34 have been reduced.

Figure 7:
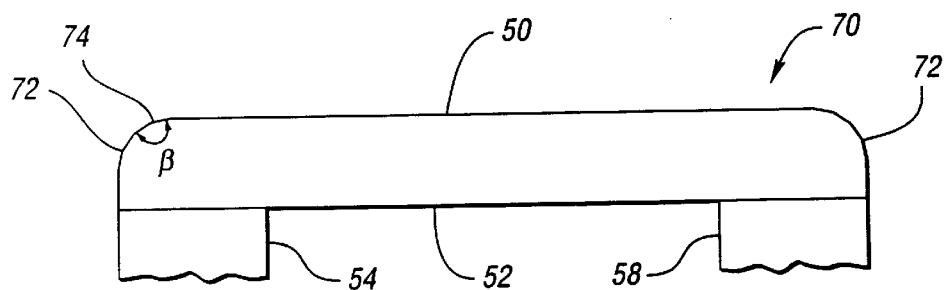
FIG. 7 is a schematic diagram of a magnetoresistive layer with conductors according to an alternative embodiment of the present invention.

Referring now to FIG. 7, a schematic diagram of a magnetoresistive layer with conductors according to an alternative embodiment of the present invention is shown. MR layer 70 includes sides 72 that appear as a sequence of straight segments. Each side 72 forms a non-acute angle β with front edge 50 at corner 74 where side edge 72 joins front edge 50.

Figure 8:
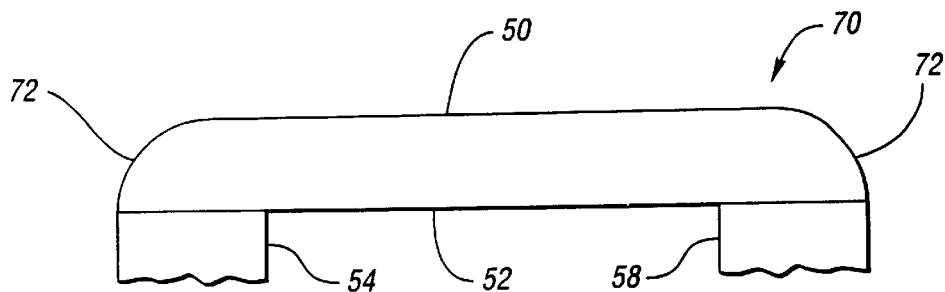
FIG. 8 is a schematic diagram of a magnetoresistive layer with conductors according to another alternative embodiment of the present invention.

Referring now to FIG. 8, a schematic diagram of a magnetoresistive layer with conductors according to another alternative embodiment of the present invention is shown. MR layer 70 includes sides 72 having at least a portion which appears as a convex curve. In the example shown, the entire side 72 is curved.

While embodiments of the invention have been illustrated and described, it is not intended that these embodiments illustrate and describe all possible forms of the invention. For example, conductors 54,58 may attach to on or more of side edges 60 near back edge 52. Rather, the words used in the specification are words of description rather than limitation, and it is understood that various changes may be made without departing from the spirit and scope of the invention.

What is claimed is:

1. A dual element read head for accessing data recorded on magnetic media passing by the read head wherein each element is a thin film magnetoresistive layer normal to the magnetic media surface comprising:

a front edge parallel with the magnetic media surface; and a back edge opposite the front edge, the back edge adjacent to conductors on either end of the back edge through which current enters and exits the magnetoresistive layer, the back edge longer than the front edge.

2. A dual element read head as in claim 1 wherein the magnetoresistive layer further comprises two side edges, each side edge joining the front edge and the back edge.

3. A dual element read head as in claim 2 wherein each side edge forms a substantially 45 degree angle with the back edge.

4. A dual element read head as in claim 2 wherein each side edge comprises a convex curve.

5. A dual element read head as in claim 2 wherein each side forms a non-acute angle greater than 90° with the front edge at a point where the side edge joins the front edge.

6. A dual element read head for accessing data recorded on magnetic media passing by the read head wherein each element is a thin film magnetoresistive layer normal to the magnetic media surface comprising:

a front edge parallel with the magnetic media surface;

a back edge opposite the front edge, the back edge longer than the front edge, the back edge adjacent to a first conductor at one end and a second conductor at an opposite end, current entering the magnetoresistive layer through the first conductor and exiting the magnetoresistive layer through the second conductor; and a pair of side edges, each side edge connecting the front edge and the back edge, each side edge operative to direct the current through the magnetoresistive layer with a substantially uniform current density.

7. A dual element read head as in claim 6 wherein each side edge is straight and joins the back edge at a substantially 45 degree angle.

8. A dual element read head as in claim 6 wherein each side edge comprises a convex curve.

9. A dual element read head as in claim 6 wherein each side edge forms an angle greater than 90° with the front edge at a point where the side edge joins the front edge.

10. A dual element read head for accessing data recorded on magnetic media passing by the read head wherein each element is a thin film magnetoresistive layer normal to the magnetic media surface comprising:

a front edge parallel with the magnetic media surface; and a pair of side edges, each side edge forming an angle greater than 90° at a point where the side edge joins the front edge.

11. A dual element read head as in claim 10 wherein each side edge is straight at the point where the side edge joins the front edge.